Aug. 8, 1967  G. E. LONG ETAL  3,334,560
CONTROL SYSTEM FOR ESTABLISHING PREDETERMINED SURFACES
Filed May 25, 1964  5 Sheets-Sheet 2
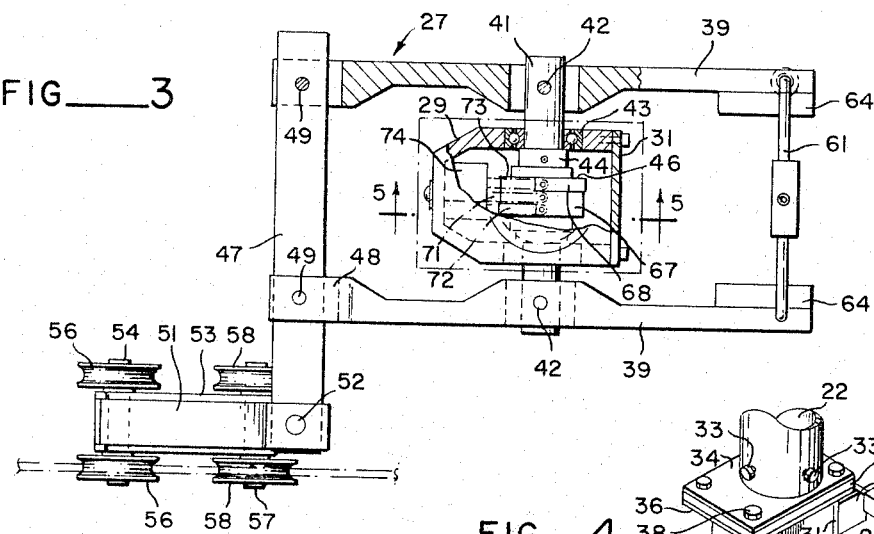
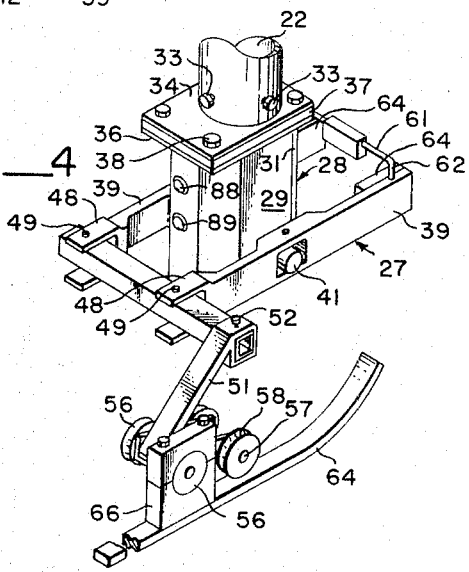
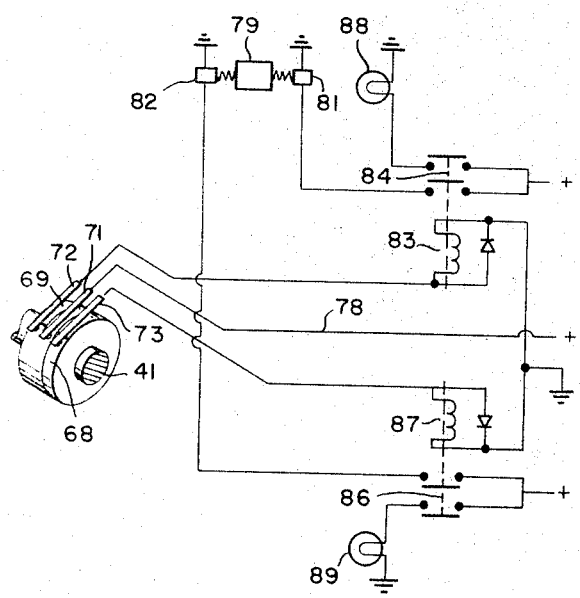
GEORGE E. LONG
HOWARD G. ANSON
*INVENTOR.*
BY *Seed & Berry*
ATTORNEYS

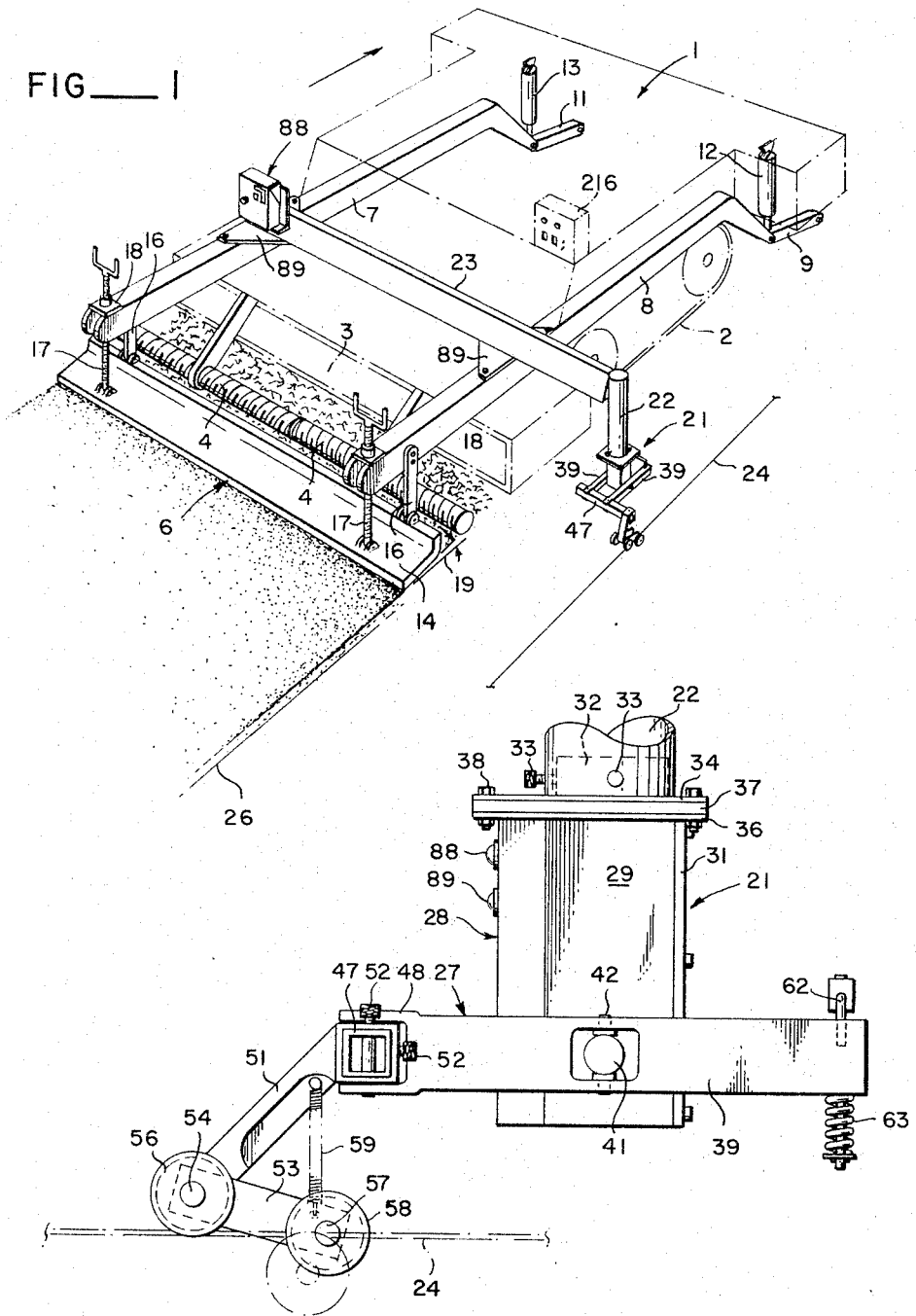

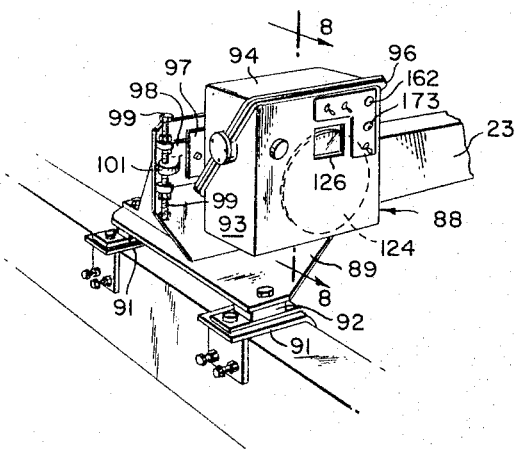
FIG__7
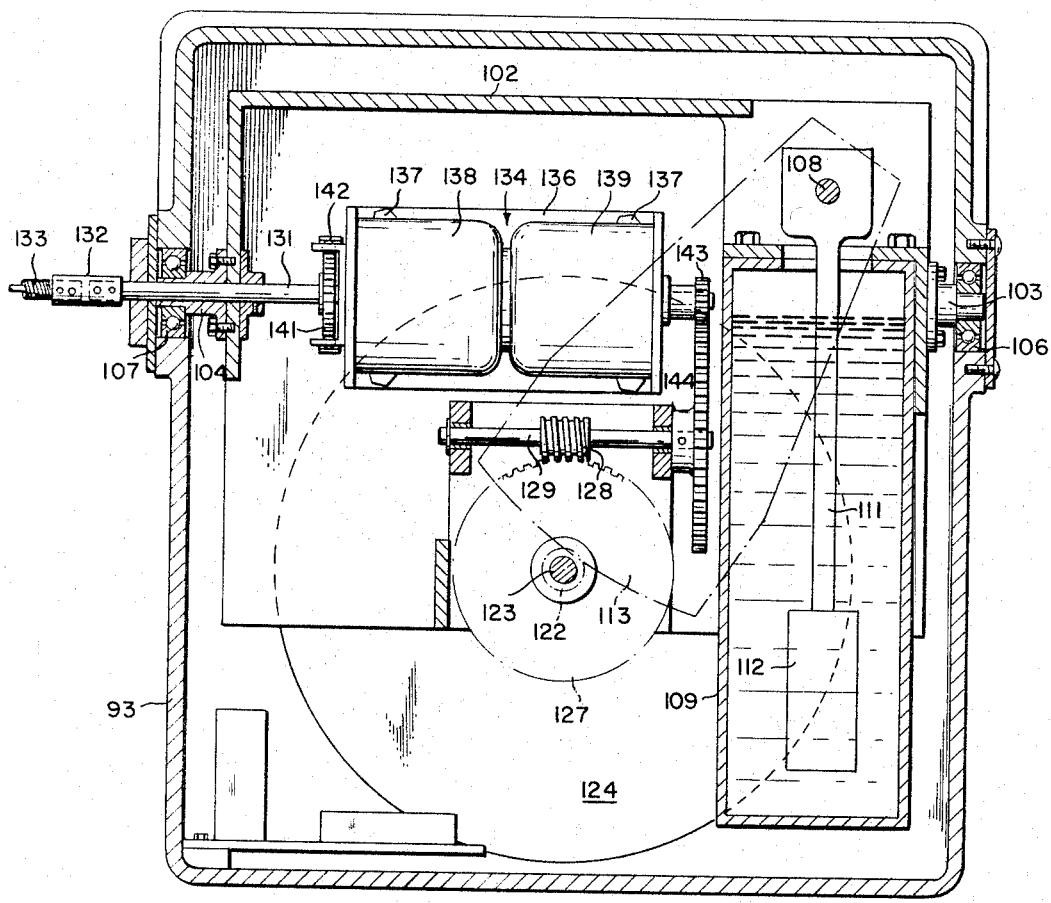
FIG__8

Aug. 8, 1967 G. E. LONG ETAL 3,334,560
CONTROL SYSTEM FOR ESTABLISHING PREDETERMINED SURFACES
Filed May 25, 1964 5 Sheets-Sheet 4
FIG__9
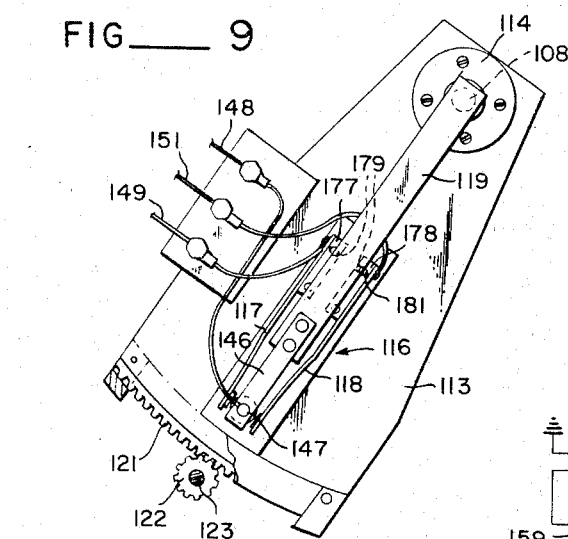
FIG__9A
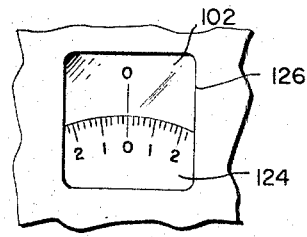
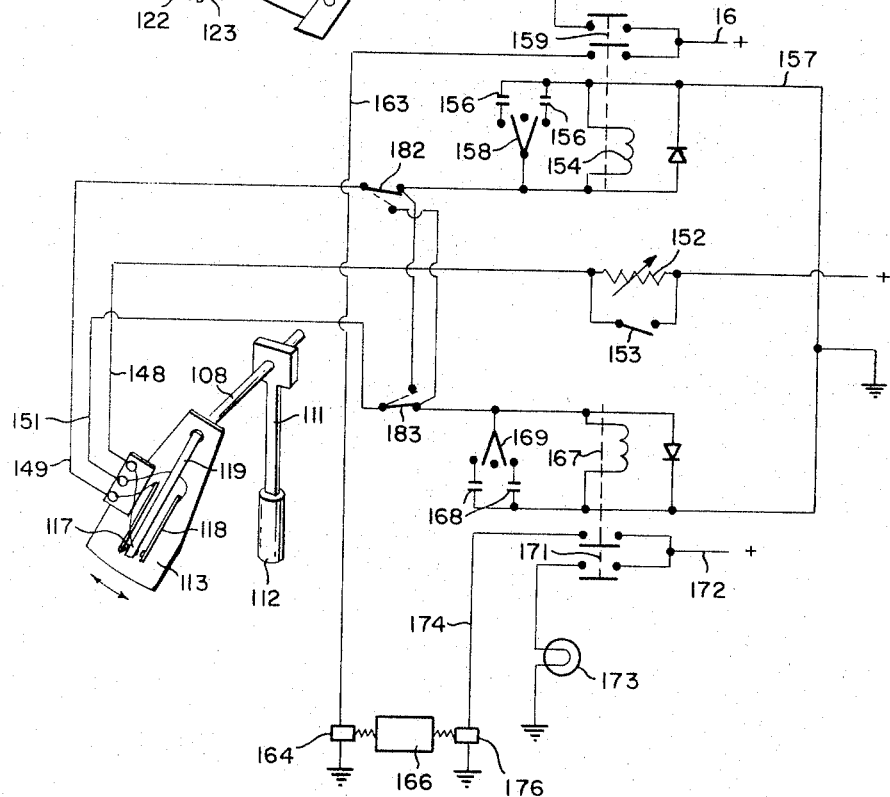
FIG__10
GEORGE E. LONG
HOWARD G. ANSON
INVENTOR.
BY *Seed & Berry*
ATTORNEYS

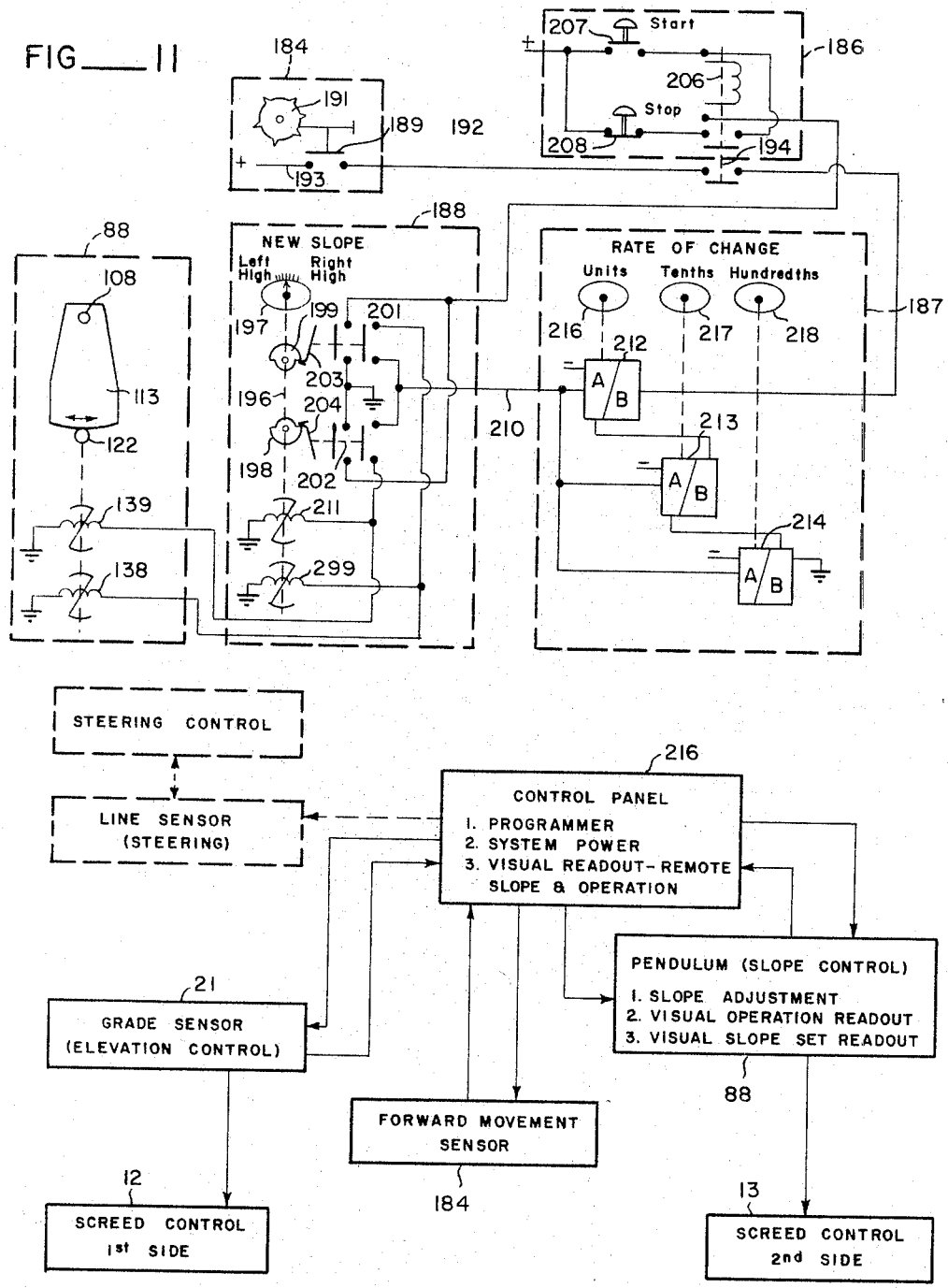

United States Patent Office 3,334,560
Patented Aug. 8, 1967

3,334,560
CONTROL SYSTEM FOR ESTABLISHING
PREDETERMINED SURFACES
George E. Long, 16041 33rd Ave. NE., and Howard G.
Anson, 15823 35th NE., both of Seattle, Wash. 98155
Filed May 25, 1964, Ser. No. 369,746
24 Claims. (Cl. 94—46)

The present invention relates broadly to a control system for sensing a preset datum or other reference and establishing a surface related to such datum with the established surface having a predetermined slope either constant or uniformly varying. In its broadest form, the present invention is in no way limited to the control of any specific machine or apparatus but may be adapted for the control of the functions of a wide variety of moving vehicles or other machines, which functions are to be related to a datum or other reference surface or line and also to the motion of the vehicle or machine. In addition to the broad aspects of the invention, a specific application of the concepts of the invention to paving machines is dealt with.

In the prior art dealing with paving machines, graders, scrapers and related machinery, certain devices and control systems have been devised for providing a positive control of the elements of the various machines which establish a surface such as a road bed, an asphalt pavement or the like. The problems encountered in constructing such devices and systems are many, rendering the majority of such prior art devices either impractical in the field or highly inefficient and ineffective for doing the job. In addition, requirements for extremely high quality in such paved surfaces as highway curves, airport runways and the like have placed burdens on the pavement finishing and grading arts not previously experienced.

To mention only a few, such inadequacies as insufficient sensitivity and the requirements for a great amount of manual control and human judgment render the existing devices unsatisfactory for many modern day requirements. Control systems which do display the requisite amount of sensitivity are usually too complex and otherwise unsuited for use on rough pavement machines and the like which are subject to a large amount of vibration and mechanical shock.

The primary object of the present invention is, therefore, to provide a control system for establishing predetermined surfaces, such system being adapted for various traveling machines and for a wide variety of purposes. The applications of the control system may specifically include level or slope sensing to provide an indication and/or a corrective signal for use on machinery, stable platforms etc., such as lathes, milling machines, missile launching platforms, drilling rigs and the like.

Another object of the present invention is to provide a control system of the type described which is highly sensitive and yet simple in structure and suitable for use on rough machinery in the field.

Another object of the present invention is to provide a control system of the type described for a pavement laying machine or the like which is capable of producing a smooth and true surface of a quality hitherto unattainable in the art.

Another object of the present invention is to provide a control system of the type described which is relatively simple in structure, highly sensitive and which is uneffected by mechanical shock, vibration, and tilting movements normally experienced in paving machines.

Another object of the present invention is to provide a control system of the character described which is capable of automatically controlling the elevation of the surface being laid and the transverse slope thereof with provision for automatic and uniform transition from one slope to a second slope setting.

Another object of the present invention is to provide a novel elevation sensor unit for sensing a preset elevation from a wire or other datum as a reference.

Another object of the present invention is to provide an elevation sensor of the character described which senses the preset datum electrically and produces a signal for controlling movable parts of a pavement machine.

Another object of the present invention is to provide an elevation sensor of the character described with an improved structural arrangement for reflecting a true reading from the datum wire or other datum reference and which will positively follow the wire or reference without jumping because of uneven movement of the machine.

Another object of the present invention is to provide a control system with a fluid dampened pendulum for slope control which is uneffected by tilting and jarring and wherein the pendulum is an actual part of a switch control for the system.

Another object of the present invention is to provide a fluid dampened pendulum of the character described wherein the pendulum is adjustable to set "zero" slope of the pendulum to correspond to "zero" slope of the paving unit.

Another object of the present invention is to provide a control system of the type described having means for programming the pendulum unit for obtaining uniform slope transition automatically with provision being also made for manual control of the slope setting and slope transition.

Another object of the present invention is to provide a control system with a programming means for obtaining automatic slope transition as a function of the forward movement of the paving vehicle.

A further object of the present invention is to provide a control system of the type described wherein sensitivity of the system may be electrically controlled by regulating electrical relays.

A further object of the present invention is to provide a pendulum unit for slope control wherein the pendulum is gimbaled transversely to the direction of motion in order to avoid side loading of the pendulum and to maintain the pendulum vertical.

A further object of the present invention is to provide a control system of the character described wherein the components thereof may be mounted at convenient separate locations on a machine to be controlled without effecting the overall function.

A still further object of the present invention is to provide a pendulum unit for slope control wherein the pendulum motion is mechanically magnified to obtain an increased sensitivity for the system.

The means by which the foregoing objects and other advantages, which will be apparent to those skilled in the art, are accomplished are set forth in the following specification and claims and are illustrated in the accompanying drawings dealing with the preferred embodiment and modifications thereof. Reference is now made to the accompanying drawings in which:

FIG. 1 is a schematic view showing a paving machine equipped with the present invention;

FIG. 2 is an elevational view of the grade sensor of the present invention;

FIG. 3 is a partially sectioned plan view of the grade sensor;

FIG. 4 is a perspective of the grade sensor showing optional use of shoe sensor element;

FIG. 5 is a detail sectional view taken along lines 5—5 of FIG. 3;

FIG. 6 is an electrical schematic of the control circuit for the grade sensor;

FIG. 7 is a perspective of the slope sensor unit;

FIG. 8 is a cross section of the slope sensor taken along lines 8—8 of FIG. 7;

FIG. 9 is a detail elevation of the sector plate of the slope sensor;

FIG. 9a is a detail view of the front face of the slope sensor unit;

FIG. 10 is an electrical schematic of the control circuit for the slope sensor;

FIG. 11 is an electrical schematic and diagram of the programmer for the slope sensor; and FIG. 12 is a functional diagram of the entire system.

As previously mentioned, the overall control system of the present invention and the individual components thereof are capable of many applications, some of which have been outlined. Since one of the major applications of the system is for the control of existing automatic paving machines, the present description is made in connection with paving machines with certain features of the overall system being particularly adapted to this use.

As shown in FIG. 1, a self propelled paving machine is indicated in diagrammatic form with only the elements essential to the present invention being shown in detail. The machine consists of a frame and body portion 1 which will usually be provided with some sort of forward propulsion means such as the track members 2. The paving material, such as asphalt or any other paving material capable of being laid down in a mat, is usually supplied to the paving machine 1 while it moves along its course by truck in a manner well known to the art. The paving machine 1 includes the necessary mechanism for feeding the paving material through an opening 3 in the rear of the frame as the machine moves in a direction indicated by the arrow in FIG. 1. The details of such mechanism form no part of the present control system, and are well known to the prior art and hence are not illustrated in the drawings. As the paving material issues from the opening 3 during forward movement of the machine, a pair of oppositely directed power driven distributing screws 4 carried by the machine frame spread a loose pile of the paving material on the roadway base over the entire width of the machine in front of the screed assembly 6. It might also be mentioned that some machines are provided with a tamping bar or vibrator, not shown, immediately in front of the traveling screed which serves to compact the loose paving material which the screed further smooths and levels to a predetermined slope and thickness in a manner which will be presently described. The details of such tamping bar or vibrator form no part of the present invention and since its operation and function are well understood in the art, such details have been eliminated from the drawing for ease of illustration of the apparatus essential for a complete understanding of the present invention.

As illustrated in FIG. 1, the screed assembly's sole connection to the machine is provided on the rear ends of two longitudinal draft beams 7 and 8. The draft beams may be coupled in any desirable manner, such as by the links 9 and 11, at their forward ends to be drawn by the paving machine 1. The forward ends of the beams 7 and 8 are independently vertically movable and are controlled for example by means of double acting hydraulic cylinders 12 and 13 which operate in a conventional manner and which will be controlled by the control system of the present invention in a manner presently to be described. It will be understood by those skilled in the art that such means as reversible electric motors or rotary hydraulic motors may be provided in place of the hydraulic cylinders 12 and 13 to perform the equivalent function.

The screed assembly 6 constitutes the screed 14 itself which may be of many forms and designs comprising essentially a transverse horizontal plate which rides directly on the top surface of the freshly laid mat of paving material. The screed 14 is connected to the rear ends of each of the beams 7 and 8 by means of the vertical supports 16 and the adjustment screws 17. The supports 16 are rigidly attached adjacent the end of each draft beam and the hand screws 17 pass through screw threaded collars 18 on the ends of the beams which permit the screws to be raised and lowered in a manner well understood in the art. Each end of the screed 14 is pivoted both to the supports 16 and the bottom ends of the hand screws 17. With this arrangement, it will be obvious that the screed may be adjusted by the hand screws 17 to vary the angle of the screed with respect to the horizontal plane.

The manner in which the thickness of the mat of paving material, the level of the top surface thereof, and the slope of the top surface is determined will be understood by those skilled in the art and by the following description. The entire screed assembly 6 is supported directly on the top surface of the freshly laid mat of paving material. The screed assembly is coupled to the main machine 1 by means of the draft beams 7 and 8 which permit it to vary in vertical level and thus to float on the finished mat while following at a fixed distance behind the machine. The compacting and smoothing function of the screed is accomplished as the screed moves over the paving material deposited immediately in front of its leading edge. The level of each new portion of the mat surface may thus be considered to be determined jointly by the level of the subgrade and the mat portion just previously laid, upon which the main body of the screed is supported, and upon the angle of inclination of the screed surface in the direction of travel. The angle of inclination of the screed will be referred to as the angle of attack of the screed and is indicated at 19 in FIG. 1. The angle of attack of the screed is, by analogy, the angle of attack at which the air foil of an aircraft engages the supporting air. It will be understood that for any particular condition of operation, including the particular paving material, and the desired thickness of mat there is typically an equilibrium value of the angle of attack for which the mat surface extends horizontally in the direction of travel. This value of the angle of attack is referred to for convenience as the critical value.

In the present illustrated machine, as is usually the practice in the art, the screed 14 is torsionally flexible about its longitudinal axis and the hand screw members 17 constitute independently operable means for adjusting the angle of attack at the respective end portions of the screed. Manipulation of the screw adjustments 17 in suitable mutual relationship permits the operator to control the transverse slope of the resulting mat. For example, by increasing the angle of attack at both ends of the screed, the mat thickness may be caused to increase substantially uniformly across the mat; and by increasing the angle of attack at one end of the screed and decreasing it at the other end, the transverse slope of the surface can be varied without substantially effecting the average thickness of the mat. In addition to the manual adjustment of the angle of attack described, the coupling means of the screed assembly, as illustrated in FIG. 1, provides an additional means for controlling the angle of attack and thus the elevation and slope of the mat produced. The control provided by the coupling means is made possible by the fact that each of the draft beams 7 and 8 may be independently raised and lowered at their forward ends by means of the lift cylinders 12 and 13.

Referring specifically to the particular coupling means shown, which involves the draft beams 7 and 8 and the lift cylinders 12 and 13, it will be seen that the angle of attack of either or both ends of the screed 14 may be varied by properly controlling the raising and lowering of the forward ends of the beams. Thus for a given screw adjustment by means of the screw members 17 for the type of paving material, and with the machine moving over a flat horizontal roadway, there is a definite equilibrium mat thickness at which the angle of attack of the screed has the above defined critical value. If the draft beams 7 and 8 are both raised or lowered with respect to the machine, the critical value of the angle of inclination of the screed is changed to produce less or greater thickness to the mat being laid down. This, of course, is assuming that the roadbed traveled by the machine 1 is level. In the event that one or the other side of the machine enters a slight depression, the thickness of the mat will remain the same providing no adjustment of the screw means 17 or the forward end of the respective beams 7 and 8 is made and the finished mat will reflect such a depression from a level plane. By proper sensing systems, however, the power cylinders 12 and 13 may be controlled to compensate for such a depression by raising the front end of one or both of the draft beams 7 and 8 to change the angle of attack of the screed to thus gradually increase the thickness of the mat of paving material as the screed passes over the depressed portion of the road bed to be covered. Likewise it will be obvious that the transverse slope of the finished mat may be also controlled by relatively raising or lowering the front ends of the draft beams 7 and 8 such as to, in effect, twist the screed 14 so as to increase the thickness of the mat on one side only with the screed providing a gradual transition from one side to the other of the mat. With the control system according to the present invention, the two functions mentioned, i.e. compensating for uneven road bed beneath the traveling machine and maintaining differential angles of attack between the two ends of the screed, is accomplished by sensing both the slope between the draft beams 7 and 8 and a reference level datum and in turn controlling the two power cylinders 12 and 13 independently. In addition to the two functions just mentioned, the present system provides an accurate and sensitive means for gradually changing the slope of the finished mat automatically according to a preset rate of change without the use of manual operation of the screw adjusting means 17. This feature provides for the accurate installation of a road surface such as used on curves or the like where the slope gradually increases from one preset slope to a maximum and back to the desired slope in the banking of a curve. This control is accomplished by the present system as a function of the forward motion of the machine to thus accomplish the smooth banking effect regardless of the speed of the machine. In the prior art, it has been necessary to manually adjust the screw members 17 involving the judgment of the operator and resulting human error with uneven slope changes being produced. The system according to the present invention permits the control features outlined to be effected by an operator at a central location on the paving machine and permits the operator to utilize one or all of the controls mentioned by selectively utilizing one or all of the control components to be described.

With the above functions in mind and with reference to the overall paving machine shown in FIG. 1, the components of the control system of the present invention will now be described in detail along with the overall function of the system.

*Grade sensor*

The grade sensor unit is indicated generally at 21 in FIG. 1 and is shown in detail in FIGS. 2 through 5 with the electrical control circuit therefor being illustrated in FIG. 6. As indicated in FIG. 1, the grade sensor 21 is mounted on a vertical post 22 fixed to one end of a transverse slope sensing beam 23, the details of which will be later described. As shown in FIG. 1, the grade sensor 21 functions to sense the location of a preset datum plane represented by a taut wire 24 which controls the grade or elevation of one side, or both as the case may be, of the finished surface of the mat 26 being laid. Although the datum plane is shown in FIG. 1 as being taken from the grade wire 24, the grade sensor 21 may be modified, as will appear later to take the grade reference from an existing pavement to which the mat 26 is being matched.

As shown in FIGS. 2 through 4, the sensor unit 21 includes a grade follower or pickup 27 and a signaling or readout device 28. For mounting purposes, the unit 28 comprises a housing or enclosure 29 with a closure plate 31 provided therefor to give access to the internal mechanism. The housing 29 also includes a cylindrical boss 32 on its upper surface which telescopes within the vertical post 22 with set screws or the like 33 being provided to secure the housing 29 to the bottom ends of the post. It may also be advisable to provide a first flange plate 34 on the post 22 and a second flange plate 36 on the housing 29 with a pad 37 of resilient material to aid in absorbing mechanical shocks or vibrations between the post 22 and the sensor unit. The flange plates 34 and 36 and the resilent material 37 may be clamped by any such means as bolts 38.

The grade follower or pickup device 27 comprises two parallel arms 39 connected along their length to a horizontal rotary shaft 41 by means of the vertical pivot pins 42 so as to allow the arms 39 to pivot in a vertical plane about the axis of the shaft 41 and in a horizontal plane about the vertical axes of the pins 42. As shown in FIG. 3, the shaft 41 may be journaled for rotation in the housing 29 by means of the bearings 43. The shaft 41 is retained within the housing 29 by any means such as the stop collars 44 and is provided with a rotary switch member 46 fixed to the mid portion of the shaft, the function of which will be presently described.

A cross bar 47 is connected between adjacent ends of the arms 39 by means of clevices 48 and the vertical pivot pins 49. The outboard end of the cross bar 47 provides a mounting for a depending support arm 51 which may be rigidly clamped thereto by set screws 52 or the like. The arm 51 provides a pivotal mounting for the swingable link 53 which may be in the form of a U-shaped channel pivoted to the arm 51 by means of a cross pin 54. The cross pin 54 is provided with a first set of grooved rollers 56 and a second cross pin 57 at the opposite end of the link 53 is provided with a second set of grooved rollers 58 which are aligned with the rollers 56. The rollers 56 and 58 on each side of the link 53 are designed to engage a grade wire 24 as illustrated in FIG. 2 and may be made from any suitable material such as plastic, metal or the like. Rollers 56 and 58 are provided on both sides of the link 53 in order to adapt the arm 51 for use with the grade sensor regardless of which side of the machine or which end of the beam 23 is used to mount the sensor unit. The swingable link 53 is resiliently suspended from the arm 51 by means of a tension spring 59 connected at one end of the link and to the mid portion of the arm 51. With this arrangement, a roller is located on both the top and bottom of the grade wire to prevent the grade follower from jumping the wire and the arms 39 transmits the movement of the arm 51 to the rotary shaft 41 as the machine changes its position relative to the grade wire as it moves forward.

As shown in FIGS. 2 through 4, the ends of the arms 39 opposite the cross bar 47 may be linked together by means of a removable tie rod 61 which has a spring pressed sliding connection at one end to one end of one of the arms 39 and includes a hook end 62 which engages a suitable hole in the end of the other arm. The rod 61 serves to rigidify the arms 39 to maintain them parallel during operation. To remove the rod 61 it merely is necessary to lift upwardly against the spring 63 to release the hooked end 62. It will be obvious from the geometry of the arms 39, bar 47 and shaft 41, that without the tie rod 61 the arms 39 are free to pivot about their vertical pivotal connection in case the machine deviates from a path parallel to the taut wire 24. The motion of the free ends of the arms 39 may be utilized, if desired, to control the steering of the machine 1 to set a course parallel to the wire. Such a control system is optional and not contained in this disclosure. It will also be noted that the free ends of the arms 39 may be provided with weights 64 of such a size to balance the arms about the axis of the shaft 41 so as to regulate the sensitivity of the sensing or pickup of the grade reference through the arms.

As previously mentioned, in some instances, it may be desirable to use an existing pavement or ground course as a reference plane instead of a preset taut wire such as the wire 24. In this case, the depending arm 51 may be directly coupled to a skid or shoe 64 of conventional design mounted on one of the rollers 56 by means such as the block 66 illustrated in FIG. 4. With this arrangement, it is not necessary to modify the roller structure.

The grade sensor 21 functions in the present system to control the movement of the forward end of the draft arm 8 as shown in FIG. 1 to determine the angle of attack of one side of the screed 14 to effect a level finished surface with the proper elevation and grade as set by the wire 24. Thus, if the controlled side of the machine enters a depression in the road bed, the shaft 41 will be rotated clockwise as viewed in the drawings to give a signal through the rotary switch 46 to cause the motor 12 to raise the forward end of the draft arm 8 thus increasing the angle of attack of that side of the screed 14 to increase the thickness of the mat in order to compensate for the depression. The opposite action takes place in case a rise is encountered by the machine 1. Once the machine moves out of the depression or off of the rise the sensor picks up the movement and returns the cylinder to the normal control level. If the bed is absolutely level and parallel with the plane established by the taut wire 24, the draft arm 8 is maintained stationary and the critical or optimum angle of attack of the screed is maintained to lay down the desired thickness of mat. FIGS. 3, 5 and 6 illustrate the rotary switch sensing device and control circuit for performing this function.

The rotary switch 46 is in the form of a cylinder and has a band 67 of electrically conductive material such as copper extending about its outer surface. A first arcuate insulator strip 68 is placed along one edge of the cylindrical surface of the switch 46 and a second insulator strip 69 is placed on the opposite edge of the cylindrical surface. The insulator strips 68, 69 have their adjacent ends aligned as shown in FIG. 6 and do not overlap.

Mounted within the housing 29 of the grade sensor unit are three leaf spring switch contacts 71, 72 and 73. Two of the switch contact arms, 71 and 73, shown in FIG. 3 are mounted on a common block 74 fixed to the wall on the housing 29. The contact arms 71 and 73 extend outwardly from block 74 with their ends being in tangential contact with the surface of the cylindrical rotary switch member 46. The third contact arm 72 is mounted on a separate block 76 also carried by the wall of the housing 29 and including an adjustment screw means 77 for adjusting the position of the contact arm 72 with respect to the remaining two arms 71 and 73. Button-like contact members are provided on the switch contact arms to insure positive engagement with the surface of the rotary switch member 46. With this structure, it will be obvious that the center contact arm 71 is always in contact with the electrically conductive material 67 and the arms 72 and 73 are either in contact with the conductive material or the surface of the insulator strips 68 and 69. As the switch 46 is turned for instance in the clockwise direction as shown in FIG. 6, the switch arm 73 rides on the insulator strip 68 and the switch arm 72 contacts the electrical conductive material 67 with a circuit being completed through the arm 72, the material 67 and the arm 71. If the rotary switch is operated in the opposite direction past a centered position, the switch arm 72 contacts the insulation material 69 and the switch arm 73 contacts the material 67 with a circuit being completed through the arm 73, the material 67 and the arm 71. Thus it will be seen that rotation of the rotary switch 46 in either direction by the sensing arms 39 from a centered position will complete a circuit through either of the arms 72 or 73 and the center arm 71. With the ability to adjust the one leaf spring arm 72, the sensitivity of the switching device may be adjusted as desired. For instance, with the arm 73 located on the insulator strip 68, the arm 72 may be moved and fixed in a position either on or off of the insulator strip 69. The amount of movement of the sensing arms 39 which will accomplish the completion of a circuit through either of the arms 72 or 73 and the center arm 71 will depend upon the relative positions of the contact arms and the conductive and insulative portions of the switch 46.

FIG. 6 illustrates the electrical circuit and circuit components for controlling a motor means such as the hydraulic unit 12 by the signals produced with the rotary switch 46 and contact arms. Referring to FIG. 6, it will be noted that the center leaf spring contact 71 always rides on the conductive material 67 regardless of the position of the rotary switch and is connected by suitable conductor 78 to one side of the power system for the machine. A solenoid operated valve 79 is provided for controlling the double acting hydraulic cylinders 12 to move in either the up or down direction and may be any conventional type of double solenoid actuated valve with a center position for locking the cylinder 12 and which may be moved to the up position or down position by means of the solenoids 81 and 82 to admit fluid pressure to either side of the cylinder 12. The contact arm 72 is connected to a relay 83 which operates a double pole throw switch 84 to energize the up solenoid 81. It may be desirable to provide the relay 83 with an arc protection device such as a diode as shown in FIG. 6 or any other well known spark suppression means. Likewise, the switch arm 73 is connected to operate the double pole double throw switch 86 by means of the relay 87 for energizing the solenoid 82. The switches 84 and 86 also complete circuits through the indicator lamps 88 and 89 respectively as shown in FIG. 6 which give the operator an indication of the control function being performed. The indicator lights 88 and 89 may be located on a remote panel in conjunction with other elements of the overall system which will be explained in conjunction with FIG. 12 or may be mounted directly on the housing as shown in FIGS. 2 and 4, or both.

Following through a typical operation of the grade sensor and control, it will be assumed for purpose of illustration that the paving machine 1 is traveling in a course parallel to the grade wire 24, both the switch arms 72 and 73 are in contact with their respective insulator strips 69 and 68, and the control cylinder 12 is in a locked position with the screed 14 being maintained at a constant angle of attack on the side controlled by the draft arm 8. In the event that the tracks of the machine on the right side of the machine shown in FIG. 1 enter a depression in the roadbed, the machine will drop causing the sensing arms 39 to rotate the shaft 41 in a clockwise direction. As may be seen in FIG. 6, this motion of the shaft 41 rotates the switch 46 in the clockwise direction moving the conductive material 67 in contact with the switch arm 72 completing an electrical circuit through the arm 71 to the arm 72. The relay 83 will be energized to close the switch 84 and to energize the solenoid 81 to move the valve 79 to the up position. At the same time, the operator is able to observe the control being effected by the visual indication being given by the signal light 88. The cylinder 12 will raise the forward end of the draft arm 8 to increase the angle of attack of the screed to increase the thickness of the mat to compensate for the depression in the roadbed. The raising of the beam 8 returns the switch 46 to the centered position breaking the circuit to solenoid 81 and the valve 79 returns to centered position to hold the cylinder 12. As the track 2 moves out of the depression in the roadbed, the rotary switch 46 will be rotated counterclockwise from its centered position and the solenoid 82 will be energized to move the valve 79 to the down position causing the power cylinder 12 to lower the draft arm 8 to decrease the angle of attack of the screed to decrease the mat thickness. The lowering of the beam 8 returns the switch 46 to the centered position breaking the circuit to solenoid 82 and the valve 79 again returns to the central position to hold the cylinder 12. It will be thus understood that an independent control is provided for one side of the screed and draft arm 8 of the machine. The means by which the opposite end of the screed and the draft arm 7 are controlled to maintain the desired slope to the finished pavement and the surface elevation will be apparent from the following.

*Pendulum slope sensor*

The pendulum slope sensor unit is illustrated generally at 88 in FIG. 1 mounted on the opposite end of the sensor beam 23 from the grade sensor 21. The pendulum slope sensor functions to maintain the desired angle of attack for the left end of the screed shown in FIG. 1 by means of the double acting cylinder 13 as a function of the positioning of the draft arm 8. The details of structure of the pendulum slope sensor are shown in FIGS. 7 through 9 and FIG. 10 illustrates the electrical circuit for effecting the slope control.

Since the amount of slope given to the finished pavement depends upon the difference between the angles of attack of the right and left ends of the screed 14, the transverse beam 23 is termed a sensor beam and is used to sense the slope between the draft beams 7 and 8 which corresponds directly to the slope given to the finished pavement. The beam 23 is a rigid beam of any desired configuration and is supported directly on top of the beams 7 and 8. As shown in FIG. 1, each end of the beam 23 may be provided with a flange plate 89 to facilitate mounting on the draft beams. As shown in detail in FIG. 7, the clamping devices 91 are used to secure the ends of the beam 23 to the draft beams 7 and 8 through the expedient of set screws or clamping bolts 91 or the like. The flange plate 89 may be secured to the clamps 91 by means of resilient rubber pads 92 which absorb some of the shock and vibration in the draft arms and allow the beam 23 to pivot the requisite amount with respect to the draft beams as they are raised or lowered relative to one another.

The pendulum slope sensor unit 88 includes a housing 93 for supporting the internal mechanism and the housing is provided with a removable section 94 with the sections 93 and 94 being clamped together at the flanges 96 by any desirable means such as screws or bolts or their equivalent. The unit is fixed to the sensor beam 23 by means of a bracket 97 fixed to a pivoted member 98 carried by the end of the beam 23 as shown in FIG. 7. The position of the unit relative to the beam 23 may be adjusted by means of the screw members 99 carried by the end of the beam 23 which engage a bearing member 101 fixed to the end of the pivoted member 98. With this arrangement, it is possible to level the unit 88 with respect to the beam 23 for setting a zero slope to the sensor to correspond to a level condition or zero slope in the beam 23 for a purpose which will be understood from the following description of the unit.

Mounted within the housing 93 is a support frame 102 as shown in FIG. 8 which has stub shafts 103 and 104 fixed thereto on opposite sides. The shafts 103 and 104 are rotatably suspended in the bearing assemblies 106 and 107 respectively, carried by the housing section 93. The bearings 106 and 107 support the internal frame 102 for free rotation about the axes of the stub shafts 103 and 104 to allow the entire frame and the components carried thereby to hang in a vertical plane regardless of the longitudinal inclination of the draft beams 7 and 8. It will be understood that the frame structure 102 and the components carried thereby are balanced, with the axes of the shafts 103 and 104 being above the center of gravity of the entire mass.

Mounted in the frame 102 is a shaft 108, shown in FIG. 8, the axis of which is at right angles and above the axis of the shafts 103 and 104. The shaft 108 may be journaled by any desirable means, not shown, for free rotation about its axis. Immediately below the shaft 108 is a pendulum tank structure 109 provided with a quantity of oil or other dampening fluid. A pendulum shaft 111 is fixed at its upper end to rotate with the shaft 108 and includes a weight 112 at its lower end with the shaft 111 and weight 112 being immersed in the dampening oil or other liquid. With this arrangement, the pendulum 111 hangs vertically regardless of the transverse or longitudinal tilt of the unit housing 93 with the relative movement between the housing and the pendulum 111 being dampened by the oil medium. A flat sector plate 113, shown in detail in FIG. 9, is mounted for relative rotation on the shaft 108 by means of a conventional bearing 114. The relative position of the sector plate 113 is preset by a means and for a purpose presently to be described and includes a switching unit indicated generally at 116 in FIG. 9. The switch unit 116 includes two leaf spring contact members 117 and 118 located on either side of a contact arm 119 which is fixed to rotate with the shaft 108. Generally speaking the sector plate 113 remains rigid with respect to the frame 102 at any particular setting which is accomplished by means to be described. Thus the contact arm 119, rigid with the shaft 108, operates between the two leaf contact members 117 and 118 and reflects the relative movement between the pendulum 111 and the frame 102 to accomplish a slope sensing and signaling means which will presently be described in detail.

Turning now to the means for positioning the sector plate 113, reference is made to FIGS. 8 and 9 of the drawings. The lower edge of the sector plate 113 is curved on a radius having the axis of the shaft 108 as a center and is provided with a toothed rack 121 meshed with the gear 122 fixed to a shaft 123 which is parallel to the shaft 108 and journaled by any desirable bearing means, not shown, for rotation by the housing 102 as indicated in FIG. 8. The shaft 123 is provided with a circular indicator plate 124 on the end opposite the gear wheel 122. As shown in FIGS. 9 and 9a, the outside surface of the indicator plate 124 is visible through the front section of the housing 93 by means of the window 126. As illustrated in detail in FIG. 8, the periphery of the indicator plate 124 is an arc having its center at the axis of the shaft 123 and is graduated in degrees on each side of a zero position with the front portion of the frame 102 bearing a zero index mark as illustrated in FIG. 9a.

The positioning of the sector plate 113, and likewise the indicator scale on the face of the plate 124, is accomplished by means of a gear 127 fixed to the shaft 123 between the positions of the gear wheel 122 and the plate 124 as indicated in FIG. 8. The gear wheel 127 is driven by means of a worm gear 128 fixed to the rotatable shaft 129 journaled in a portion of the frame 102 as indicated. The shaft 129 is connected to be driven by a drive shaft 131 passing through the stub shaft 104 and connected by means of a coupling 132 to a flexible cable 133 which may be rotated by manual means, not shown, at any remote position. The drive shaft 131 also constitutes the common drive shaft of a bi-directional digimotor unit 134 carried by a bracket 136 fixed to a portion of the frame 102 by means of the bolts 137 as shown in FIG. 8. The unit 134 constitutes a commercially available and well known motor unit which includes first and second digimotors 138 and 139 for driving the shaft in predetermined increments of rotation in either direction depending upon which motor is energized as will be described later. The unit 134 also includes a ratchet mechanism comprising a notched wheel 141 fixed to the shaft 131 and the spring pressed ball detents 142 for maintaining the shaft 131 in its set position of rotation.

The inboard end of the shaft 131 is provided with a gear 143 in mesh with the gear wheel 144 carried by one end of the shaft 129.

Referring to FIG. 9, the contact arm 119 is provided with a contact member 146 fixed to its free end which is provided with a contact button 147 electrically connected to a lead wire 148 the purpose of which will be later described in connection with the control circuit shown in FIG. 10. Each of the leaf spring arms 117 and 118 is also provided with conventional point contacts as indicated in the drawings which are adapted to make and break contact with the button 147. The leaf spring members 117 and 118 are connected to suitable electrical lead wires 149 and 151 respectively. It will thus be obvious that, as the pendulum controlled arm 119 moves relative to the sector plate 113 as a result of lateral tilting of the beam 23 and the sensing unit, contact will be made between one of the leaf springs 117 and 118 and the contact button 147 of the arm 119, to give an indication of the slope of the beam 23 in one direction or the other from horizontal or from a preset slope.

With the structure described, means is provided for obtaining an electrical signal upon deviation either up or down from a desired slope of the sensor beam 23 as follows. The shaft 131 is initially rotated in order to align the zero indexing mark on the surface of the frame 102 with the zero index mark on the graduated scale of the plate 124 as shown in FIG. 9a, through the gearing system described. The draft beams 7 and 8 are then aligned so as to level the sensor beam 23. The adjustment screws 99 may then be operated to bring the unit housing and the sector plate 113 to a position with the contact button 147 of the pendulum controlled arm 119 centered between the point contacts of the leaf spring members 117 and 118. Establishing this condition for the unit insures that a zero slope of the sensor beam 23 will correspond to a zero slope indicated on the dial plate 124 with no signal being produced through the pendulum controlled arm 119. The scale on the dial plate 124 is graduated in terms of percent slope in both directions from a zero slope or level condition. The scale on plate 124 is pre-calibrated with relation to the amount of movement of the contact member 146 of the pendulum controlled arm 119 which reflects each degree of relative movement between the pendulum and the unit housing as the housing is tilted from a given position after the contact member 146 has been centered between the leaf springs 117 and 118 with a zero slope reading on the dial 124. After the calibration has been made and the zero reading set, it is merely necessary to set the dial 124 by means of rotating the shaft 131 to read in terms of a slope desired to be sensed and controlled. Thus, after calibration, and with a slope reading of 1% for instance on the dial 124, a signal will be produced through the contact member 146 and one of the leaf spring contacts 117 and 118 until the housing is tilted to a one degree slope to return the member 146 to a position midway between and out of contact with the leaf springs 117 and 118. Any deviation in either direction from the 1% slope will cause a signal through one of the leaf spring contacts and this signal is then used to control a solenoid valve for actuating the cylinder 13 in either direction to correct the slope of the sensor beam 23. In this manner, and bearing in mind that the draft beam 8 as shown in FIG. 1 is under constant control of the grade sensor unit 21, a constant slope on the sensor beam 23 may be maintained by controlling the relative vertical positioning of the draft arm 7 through the motor 13.

FIG. 10 illustrates the electrical system for controlling the hydraulic motor 13 through the pendulum slope sensor unit 88. As seen in FIG. 10, the sector plate 113 has been set by means of the dial 124 and the rotatable shaft 131 to correspond in position to a particular desired slope with the contact button 147 of the pendulum controlled arm 119 being centered between the leaf spring arms 117 and 118 and it is assumed that the sensor beam 23 is on the proper slope with no contact being made through either leaf spring contact. The contact button 147 is connected through the lead wire 148 to the electrical power system of the machine as illustrated in FIG. 10, with a variable rheostat 152 being provided in the conductor 148 in parallel with a by-pass switch 153 the significance of which will later be described. The leaf spring contact 117 is connected by the conductor 149 to a relay 154 having a conventional diode arc prevention means as shown or any other well known spark supression. A pair of capacitors 156 are placed in parallel with the relay 154 connected between the ground line 157 and the conductor 149 by means of the double switch 158 which functions to selectively connect either one or both of the capacitors in parallel with the relay or to completely disconnect the capacitors from the circuit. The relay 154 serves to operate the double pole double throw switch 159 to complete circuits through the system power conductor 161 to an indicator lamp 162 and the conductor 163. The lamp 162 may be located at a central control panel or on the face of the unit 88 as shown in FIG. 7 or both to indicate to the operator that the system is operating to raise the draft beam 7 to correct the slope. The conductor 163 is connected to a solenoid 164 for operating the hydraulic valve unit 166 to condition the cylinder 13 to raise the draft arm 7. The valve unit 166 is in all respects identical to the valve unit 79 for controlling the positioning of the hydraulic motor 12 as previously described.

The other leaf spring contact 118 is connected via the conductor 151 to an identical electrical hookup which includes the relay 167 with its arc preventing diode, the capacitors 168, the ground conductor 157 and the double switch 169. The double pole double throw switch 171 corresponds to the switch 159 and serves to complete circuits through the power system conductor 172, the indicator light 173, and the conductor 174 connected to a second solenoid 176. The lamp 173 is used to indicate to the operator that the hydraulic motor 13 is being operated to lower the draft beam 7 to correct the slope by means of the solenoid 176 and the valve unit 166 as previously described.

Two separate means are provided for controlling the sensitivity of the sensing function provided by the arm 119 and the leaf spring contacts 117 and 118. The first means comprises a mechanical expedient and involves the physical adjustment of the position of the leaf spring contacts 117 and 118. As shown in FIG. 9, the leaf spring contacts 117 and 118 are connected to brackets 177 and 178 respectively with the brackets being pivotally adjustable by means of the slots 179 and set screws or the like 181. With this arrangement, either or both of the leaf springs may be adjusted to increase or decrease the distance therebetween to require a greater or lesser movement of the arm 119 to make contact.

The second means for controlling the sensitivity of the sensor switch involves the variable rheostat 152 and the capacitors 156 and 168 previously described. It will be of course obvious that both the rheostat 152 and the capacitors 156 and 168 may be by-passed in the system by operation of the switches 153, 158 and 169. When sensitivity control is desired, the rheostat 152 will be set to control the amount of current flowing to either the relay 154 or 167 depending upon which is to be energized. By decreasing the amount of current flowing to the respective relays, operation of the relays will not occur until sufficient voltage is built up by one or both of the capacitors 156 and 168 sufficient to provide energization of the relay. In this manner, sustained contact between the button 147 and the points of either of the leaf spring contacts 117 and 118 will be necessary in order to energize the relays. The rheostat 152 and switches 153, 158 and 169 may be located on a central control panel along with other control elements of the system or may be placed on the face of the unit 88 as desired.

Since it is desirable to be able to effect control of either of the cylinders 12 or 13 to effect either side of the screed 14, it will be necessary to provide manual switches 182 and 183 with cross-over connections between the conductors 149 and 151 to reverse the high and low control features of the circuit. Thus it is immaterial which of the beams 7 or 8 is controlled by the grade sensor 21 and which is controlled by the pendulum slope sensor 88 as long as the proper control is made of the hydraulic cylinders 12 and 13. This feature is of importance in practice where job conditions may dictate the positioning of the grade sensor on one or the other side of the machine.

*Slope change programmer*

As thus far described, the system constitutes a first sensing and control means for one side of the paving screed and a second sensing and control means for maintaining a constant slope between the draft arms with the grade sensor controlled draft arm providing the reference side of the slope. As beforementioned, it is frequently desirable to provide a uniformly increasing or decreasing slope or uniform rate of change of slope of the finished pavement in order to construct banked curves in a paved surface. The present invention provides an automatic control system which may be programmed to effect a uniform rate of change of the slope setting of the pendulum control unit 88. The system is shown diagrammatically in FIG. 11 and operates on the basis of the desired rate of change in terms of percent of slope change per one thousand feet or forward travel of the machine in the transition from a given percent slope to a new percent slope. Although the particular system illustrated operates in terms of percent per one thousand feet of travel, it will be obvious to those skilled in the art that the system could be altered to function in terms of any given amount of the forward travel with the one thousand feet basis being chosen merely for ease of understanding.

As shown in FIG. 11, the programming system includes a forward movement pulser 184, an actuator switch unit 186, a rate of change controller 187, and a new slope control unit 188 electrically connected to actuate either one or the other of the digimotors 138 and 139 of the pendulum slope sensor unit 88 shown diagrammatically in FIG. 11.

The forward movement pulser 184 constitutes a switch 189 and a switch actuator 191 which is geared to the drive element of the paving machine such that a fixed discrete element of forward motion provides a momentary closing of the switch 189 by means of the cam elements on the surface of the switch actuator. In the present instance, the switch actuator will be constructed to close the switch 189 once for each foot of forward travel of the machine. The closing of the switch 189 makes available a pulse in the conductor 192 by connecting the conductor to the system power source through the conductor 193. The actuator switch unit 186 includes a double pole double throw switch 194 which, when closed, allows the pulse to be delivered to the rate of change controller 187. Thus for a thousand feet of forward travel of the machine, one thousand evenly spaced pulses will be delivered through the conductor 192.

The new slope control unit 188 includes a rotary shaft 196 having a dial 197 which is graduated to indicate the new slope desired and the direction in which the slope change is to be effected, depending upon which side of the screed is being controlled by the pendulum slope sensor 88. For instance, if the unit 88 is controlling the left side of the screed as shown in FIG. 1, and the slope is to be increased by raising the draft arm 7, the dial 197 would be turned counterclockwise as shown in FIG. 11 to further raise the left draft arm. If the slope is to be decreased, indicating that the left draft arm 7 is to be lowered, the dial 197 is turned clockwise to lower the draft arm. The shaft 196 is provided with two cam members 198 and 199 which, when rotated, serve to close the switch 201 or 202 through the followers 203 and 204 respectively, depending upon which direction the shaft 196 is rotated. From the circuit shown in FIG. 11, it will be obvious that the closing of either of the switches 201 or 202 conditions the relay 206 to be energized by means of a start switch 207. The switch 207 is a momentary push-button switch which is normally open and it will be seen that a holding circuit including the normally closed switch 208 is provided for the relay 206. The relay 206 serves to close the double pole double throw switch 194 to permit the pulses from the unit 184 to be delivered to the rate of change controller 187. The pulsing circuit may be opened by using the manual stop switch 208 to break the holding circuit for the relay or by the return of the cams 198 and 199 to the original zero or off position as shown in FIG. 11 to allow the switches 201 and 202 to open.

As mentioned, the shaft 196 is rotated for setting the new desired slope resulting in the closing of one of the two switches 201 or 202 depending upon the direction of rotation of the shaft. The cams 198 and 199 are returned to their off position as shown in FIG. 11 by means of either one or the other of the two stepping motors 209 and 211. The motors 209 and 211 operate in opposite directions and receive pulses through the conductor 210 and the switches 201 and 202 respectively such that the stepping motor 209 will return the cam 199 to its zero position and stepping motor 211 will return the cam 198 to its zero position wherein the switches 201 and 202 are in the open condition shown in FIG. 11. The amount of displacement of each of the cams is dependent upon the value of the new slope setting and likewise the number of pulses required to operate the stepping motors to return the cams to their zero positions is proportional to the original displacement of the cams. It will also be seen in FIG. 11 that the stepping motor 211 is connected in series with the stepping digimotor 139 and the motor 209 is connected in series with the motor 138 and it will be understood that the motors operate in synchronism so that as the motor 211, for instance, returns the cam 198 to its zero position, the motor 139 operates the shaft 123 to move the sensor plate 113 to a new slope value.

Turning now to the details of operation of the rate of change controller 187, three independent stepping switches 212, 213 and 214 are provided to produce the pulses which are required to operate the motors 209, 211, 138 and 139. The stepping switches 212, 213 and 214 are commonly known and commercially available stepping switches of which many varieties and types are available as will be understood by those skilled in the electrical arts. Each of the stepping switch units in essence includes two functional components, one being a multiple position rotary selector switch and the other being a drive for the switch which advances the switch one position for each electrical pulse received from a remote source. Each of the stepping switches 212, 213 and 214 thus includes a selector switch unit A and a pulse driven stepper B. Each step of the pulse driven stepper causes an output pulse to be made available to be passed along by the stepper switches A. By setting the stepper switches, one or any proportion of the available positions of the selector switches may be set to transfer the pulse. Each of the stepping switch units 212, 213 and 214 is provided with means to condition the unit to deliver any given number of the total amount of the pulses available from the unit. In the present invention, each of the stepping switch units includes a ten position rotary selector switch with the settable indicator elements 216, 217 and 218 being provided to select one to nine of the pulses of each ten for each unit to be delivered to the conductor 210 for driving the stepping motors 209 and 138 or 211 and 139 depending upon the setting of the new slope control unit. The tenth pulse of the unit 212 is made available to the unit 213 and likewise the tenth pulse of the unit 213 is made available to the unit 214. With this arrangement, a count to one thousand by ones or by any other number, by sorting out a proportion of the pulses delivered, is possible with the rate of change controller.

As previously mentioned, the forward movement pulser 184 in the present instance is chosen to give an electrical pulse by closing the switch 189 upon the completion of each foot of travel of the machine. Thus, with one thousand feet of forward movement, one thousand discrete pulses are delivered to the rate of change control unit 187. The operator then sets the unit 187 in terms of rate of change of slope in terms of percent of change per one thousand feet of forward travel. For instance, if the rate of change of the slope is 1.27% per one thousand feet of travel, the dial 216 is set on one, the dial 217 is set on 2 and the dial 218 is set on 7. This will condition the unit 212 to deliver one out of every ten pulses available to the conductor 212 with the tenth pulse being used to step the unit 213. The unit 212 will thus deliver one hundred pulses out of the one thousand available and the unit 213 will deliver 20 pulses and, with every tenth pulse of the unit 213 being used to step the unit 214, the unit 214 will deliver seven pulses out of the one thousand available. In this manner, one hundred and twenty of the one thousand pulses available will be delivered through the conductor 212 to operate the stepping motors to return the new slope setting dial 197 to the zero position and to change the slope setting of the pendulum slope sensor 88. Since the number of steps or pulses required to return the cams 198 and 199 to their zero position is proportional to the amount of displacement of the cam surfaces from the zero or off position, the rate of change control unit 187 will return the cams to their original position as the sensor plate 113 is given its new setting and the circuit will be broken through the switches 201 and 202 to hold the new slope setting. The new slope setting is held until the next desired slope change is given to the unit 187.

FIG. 12 is a functional diagram of the control system of the present invention and will serve for an understanding of the coordinated functions of the individual components of the system as applied to a paving machine. The control panel provided for the operator is indicated at 216 in FIG. 12 and may be located at any convenient spot on the machine as indicated in FIG. 1. The control panel may serve as a convenient location for the different components of the programmer described and may also be used as a central location for remote positioning of the various manual switches and signal lights as will become apparent. Since the components of the system are unitary devices and may be moved about on the machine frame as desired, the control panel 216 may also provide a central terminal board for connecting the electrical components to the power system of the machine.

As indicated in FIG. 12, the grade sensor unit 21 receives its power from the machine power system through the control panel and, in the manner described previously functions to sense deviations from the datum reference or grade line and produces a signal for controlling the motor unit 12 for corrective movement of one side of the screed. As described in connection with FIG. 6, the signal produced by the grade sensor unit may also be used to give a visual readout as to the corrective action being effected by the unit in the nature of the lamps 88 and 89. The lamps may be located directly on the unit housing 29 as illustrated in FIGS. 2 to 4 or may be located on the control panel 216 or at both locations in order that the operator may visually monitor the system. As mentioned earlier, the swinging action of the arms 39 of the grade sensor unit may be utilized in order to control the steering of the paving machine if desired and is optional as shown in FIG. 12. With the one side of the screed being constantly controlled by grade sensor, that side of the machine and the associated draft beam becomes a reference for sensing and controlling the slope between the draft arms which directly reflects the slope to the finished pavement. Thus the pendulum slope sensor 88 receives its power through the control panel 216 and functions to produce a signal when the slope of the sensor beam 23 deviates from a particular slope reading set into the sensor unit by means of the rotatable shaft 113 and the indicator plate 124. The signal produced by the unit 88 then controls the motor 13 to perform the correcting action. The signal produced by the unit 88 is also used to actuate the signal lights 162 and 163 to indicate to the operator the corrective action being effected. As in the case of the grade sensor unit, the lamps 162 and 173 may be located on the unit 88 itself or may be located remotely on the control panel 216 or both. In addition, the switches 153, 158, 169, 182 and 183 may be located on the unit 88 itself as shown in FIG. 7 or may be mounted remotely on the control panel 216 or both, the electrical wiring of which will be obvious to anyone skilled in the electrical arts. In this sense, the pendulum slope control unit 88 functions to give a feed back to the panel 216 in the form of a remote visual readout.

The forward movement pulser 184 may also receive electrical power through the control panel 216 and return a pulsing signal to the programmer including the switch unit 186, rate of change controller 187, and new slope control unit 188 all of which may be mounted on the control panel 216. The start and stop switches 207 and 208 for the programmer may be located on the control panel along with the dial members 216, 217 and 218 for setting the rate of change of slope desired and the dial member 197 for initiating action of the slope change to the new desired slope. The electrical pulses from the programmer are then used to control the pendulum slope control unit 88 in order to move the slope setting gradually and uniformly to the new desired setting.

The present invention not only provides an efficient and automatic system for controlling the screed of a paving machine, but offers a system which is adaptable to many types of machines and devices wherein movable elements are to be controlled with relation to a preset datum or reference datum. It will also be obvious that the independent units of the system and specifically the grade sensor unit and the pendulum slope control unit are capable of independent function aside of the system of the present invention and, in themselves, provide new and improved structure and control features.

It will be readily apparent to those skilled in the art that the present invention provides novel and useful improvements in control systems of the type described and in the independent components thereof. The arrangement and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. In a machine having a torsionally flexible transverse screed and two draft arms connected to opposite ends of said screed and to said machine at their forwards ends, said draft arms being independently adjustable to control the angle of attack of both ends of said screed independently, a control system comprising; on-off switch means for producing a first non-proportional directional signal in response to variation in either direction from a selected elevation of one of said draft arms with respect to a fixed grade datum, a first power means responsive to said first signal for adjusting said one draft arm to maintain said selected elevation, adjustably settable means to represent the desired transverse slope between said draft arms, on-off switch means for producing a second non-proportional directional signal in response to variation in either direction from said slope, a second power means responsive to said second signal for adjusting the other draft arm to maintain said slope, and adjustable means for resetting said settable means in preselected increments responsive to increments of forward movement of said machine to uniformly vary said slope as desired in either direction.

2. In combination with a machine having a movable member, and power means for adjusting the elevation of said member with respect to a fixed grade reference datum, a grade sensing and control device comprising; a housing unit, means for mounting said unit in fixed relation to said member, a rotary shaft mounted in said housing, on-off rotary electrical switch means carried by said shaft, said switch means having a center off position and signal means for producing a signal upon movement in either direction from said center position, a sensing arm fixed to said rotary shaft, means to connect said sensing arm to said reference datum for rotating said shaft and moving said switch in either direction upon relative movement between said member and said datum, and means responsive to said signal means for actuating said power means for adjusting said member to maintain said member at a constant elevation relative to said datum.

3. The device according to claim 2 wherein, said grade reference datum comprises a preset taut wire, and said means to connect said sensing arm to said datum comprises; a support arm connected to said sensing arm, a link pivotally connected at one end to the free end of said support arm, elastic means connected between the other end of said link and said support arm, and spaced grooved rollers carried by said link for contacting both sides of said taut wire.

4. The device according to claim 2 wherein said datum reference constitutes a preexisting surface and said means to connect said sensing arm to said datum comprises; a support arm connected to said sensing arm, a skid member for contacting said surface, and means to connect said skid to said support arm.

5. A slope sensing and signal device comprising; a housing, means to support said housing on a surface to be controlled, a frame, means supporting said frame within said housing for free rotation about a first axis located above the center of gravity of said frame, a pendulum shaft mounted on said frame, the longitudinal axis of said pendulum shaft being at right angles to said first axis, a pendulum fixed to said shaft, means in said housing to dampen the movement of said pendulum, a sector plate rotatably mounted on said pendulum shaft, means in said housing to adjustably set said sector plate in fixed relation to said frame to correspond to a preselected slope quantity, a contact arm fixed to said pendulum shaft and positioned to swing in an arc across the surface of said plate, spaced flexible contact members adjustably fixed to said plate and positioned on opposite sides of said contact arm, electrical circuit means connected to said contact arm and said contact members, whereby tilting of said housing in either diretion will swing said pendulum to bring said contact arm into electrical contact with one of said contact members to complete an electrical signal circuit indicating a deviation from the slope setting of said sector plate.

6. The device according to claim 5 wherein, said means to adjustably set said sector plate comprises, a rotatable control shaft, means to connect said control shaft to rotate said sector plate, and graduated dial means for indicating the slope setting of said plate, said support means for said housing being adjustable to calibrate the slope setting of said sector plate to correspond to the true slope of said surface.

7. The device according to claim 5 including, power means for adjusting the elevation of the surface to be controlled, means to actuate said power means for correcting the slope of said surface responsive to the signal from said electrical signal circuit.

8. The device according to claim 7 wherein said electrical circuit means includes means for electrically controlling the sensitivity of said contact members and said contact arm.

9. A slope sensing and signal device comprising; a frame, means to support said frame for free swinging motion about a first axis above the center of gravity thereof, a pendulum, means to mount said pendulum on said frame for swinging movement about an axis at right angles to said first axis, a sector plate, means adjustably mounting said plate on said frame to correspond to a preselected slope quantity, a contact arm mounted to swing across said plate and connected to reflect the motion of said pendulum, and adjustably mounted switch contacts carried by said sector plate and positioned on opposite sides of said contact arm, whereby tilting of said frame to swing said pendulum in either direction will bring said contact arm into contact with one of said switch contacts to produce a signal.

10. A slope sensing and control device for controlling the transverse slope between the draft arms of the screed of a paving machine comprising; a sensor beam extending between said arms for reflecting the slope therebetween, a housing mounted on said beam, a pendulum, means providing a gimbaled mounting for said pendulum within said housing, a settable member located in said housing and positioned to represent a preselected slope quantity for said beam, means operatively connected to said pendulum for projecting the movement thereof to said settable member, signal means carried by said settable member for producing a signal responsive to movement of said pendulum upon movement of said beam from said preselected slope, and programming means operatively connected with said settable member and said paving machine for resetting said settable member in preselected increments responsive to increments of travel of said machine to vary said slope over a course of travel.

11. The device according to claim 10 wherein, said settable member includes a rotatable control shaft connected to adjust said settable member and wherein said programming means comprises; electrical circuit means, a pulsing switch in said circuit and operatively connected to produce evenly spaced pulses in response to movement of said machine, manually operable switch means for connecting said pulsing switch in said circuit, a settable switching unit in said circuit, said settable switching unit having a centered open position to deenergize said pulsing switch and quantitative settings in either direction proportional to a new desired slope setting for said settable member, a first set of stepping motors operatively connected to return said switch unit to the centered position and a second set of stepping motors in series with said first set of motors and connected to said control shaft for moving said settable member to the new slope setting, pulse responsive stepping switches in said circuit connected in series between said pulsing switch and said first and second sets of stepping motors, said stepping switches including settable means to deliver a preselected number only of the pulses delivered by said pulsing switch proportional to the quantitative setting of said switch unit and to the new slope setting so as to return said switch unit to the centered position and move said settable member to said new slope setting.

12. The device according to claim 10 wherein, said programming means comprises an electrical pulser unit operatively connected to pulse in response to movement of said machine, a settable switch unit for closing an electrical circuit to said pulser, a first set of stepping motors operatively connected to return said switch unit to the open position and a second set of stepping motors operatively connected to move said settable member to a new slope setting, said sets of stepping motors being synchronized and located in series in said circuit, and pulse responsive stepping switches including means for delivering a preselected number only of the pulses delivered by said pulser to drive the stepping motors to return said switch unit to the open position and to move said settable member to the new slope setting.

13. The device according to claim 10 wherein, said programming means comprises; an electrical pulser unit operatively connected to pulse in response to movement of said machine, a settable switch unit for closing an electrical circuit to said pulser, first and second motor means operatively connected to return said switch unit to the open position and for moving said settable member to a new slope setting simultaneously, and pulse responsive stepping switches operative to deliver a preselected number only of the pulses delivered by said pulser to drive said motor means.

14. The device according to claim 10 wherein, said programming means comprises; a pulser unit operatively connected to pulse in response to movement of said machine, settable switch means for closing an electrical circuit to said pulser, pulse driven motor means operatively connected to open said settable switch means and to reset said settable member simultaneously, and means for delivering a selected number of pulses available from said pulser to drive said motor means.

15. A control system for controlling the positioning of two independently movable members with respect to the transverse slope therebetween and to a grade reference datum comprising; motor means operatively associated with said members and adapted to control the position of the members independently, a transverse sensor beam extending between and supported by said members, a grade sensor unit mounted in fixed relation to one of said members and including a rotary shaft, sensing means connected to rotate said shaft in either direction responsive to deviation in elevation of said one member in either direction from the reference datum, an on-off rotary switch mounted on said shaft and having a cylindrical surface, an electrically conductive material on the cylindrical surface, a first wiper contact member in continuous contact with said conductive material, oppositely directed insulation strips flush with the surface of the conductive material, second and third wiper contact members associated with said insulation strips, electrical circuit means connected to said wiper contact members and to said conductive material, said second and third wiper contact members being in contact respectively with the insulation strips in a centered position of the shaft and so arranged as to pass onto said conductive material as the shaft is rotated in either direction from the centered position to produce a grade control signal, said motor means being energized responsive to said grade control signal to position said one member, and a slope sensor unit mounted on said sensor beam and including pendulum means, sector plate means, means to mount said sector plate in adjustably fixed relation to said pendulum to correspond to a preselected slope quantity, a contact arm fixed to move with said pendulum and positioned to swing in an arc across the surface of said plate, spaced contact members adjustably fixed to the plate on opposite sides of said contact arm, electrical circuit means connected to said contact members and to said contact arm, whereby deviation of said beam from a set slope quantity will produce a slope control signal, said motor means being actuated in further response to said slope control signal to position said outer member.

16. The control system according to claim 15 including; means for adjusting the position of said sector plate in preselected increments responsive to increments of forward movement of said vehicle to uniformly vary the slope quantity in either direction as the vehicle moves.

17. In combination with a machine having a movable member, and power means for adjusting the elevation of said member with respect to a grade reference datum, a grade sensing and control device comprising; a housing unit, means for mounting said unit in fixed relation to said member, a rotary shaft mounted in said housing, on-off rotary electrical switch means carried by said shaft, said switch means having a cylindrical surface, an electrically conductive material on the cylindrical surface, a first wiper contact in continuous contact with said conductive material, oppositely directed insulation strips flush with the surface of the conductive material, second and third wiper contacts associated with said insulation strips, electrical circuit means connected to said wiper and said conductive material, said second and third wiper contacts being in contact respectively with the insulation strips in the centered off position of the switch and so arranged as to pass onto said conductive material as the shaft is rotated in either direction from the centered position to produce a directional grade control signal, and sensing means connected to rotate said shaft upon relative movement between said member and said reference datum, said power means being actuated responsive to said grade control signal.

18. In combination with a machine having a movable member, and power means for adjusting the elevation of said member with respect to a fixed reference datum, a sensing and control device mounted in a fixed relation to said member and comprising; a rotary on-off electrical switch, means to mount said switch in said control device, said switch means having a cylindrical surface, an electrically conductive material on the cylindrical surface, a first wiper contact in continuous contact with said conductive material, oppositely directed insulation strips flush with the surface of the conductive material, second and third wiper contacts associated with said insulation strips, electrical circuit means connected to said wiper contacts and said conductive material, said second and third wiper contacts being in contact respectively with the insulation strips in the centered off position of the switch and so arranged as to pass onto said conductive material as the switch is rotated in either direction from the centered position to produce a directional control signal, and sensing means connected to rotate said switch upon relative movement between said member and said reference datum, said power means being actuated responsive to said control signal.

19. In a grade sensing and control device having means for sensing a deviation in elevation between a movable member and a reference datum, and power means for adjusting the elevation of said member, a signal device comprising; a rotary shaft connected to be rotated in either direction by said sensing means, first and second electrical control means for actuating said power means, an electrical switch comprising a cylindrical member carried by said rotary shaft, an electrically conductive material on the surface of said cylindrical member, a first contact member in continuous contact with said conductive material, oppositely extending insulation strips on said conductive material, and second and third contact members associated with said insulation strips, said second and third contact members being in contact with said insulation strips in the centered position of said switch and so arranged as to be moved onto said conductive material alternately as said shaft is rotated alternately in opposite directions by said sensing means to said first and second contact positions, whereby movement of said switch to either of said first or second contact positions causes energization of said power means to maintain said member at a constant elevation.

20. A slope sensing and signal device comprising; a frame, a pendulum, means swingably mounting said pendulum on said frame, a sector plate, means adjustably mounting said plate on said frame to correspond to a predetermined slope quantity, a contact arm mounted to swing across said plate and connected to reflect the motion of said pendulum, and adjustably mounted swich contacts carried by said sector plate and positioned on opposite sides of said contact arm, whereby tilting of said frame to swing said pendulum in either direction will bring said contact arm into contact with one of said switch contacts to produce a signal.

21. A slope sensing and signal device for controlling the transverse slope between the draft arms of a traveling machine comprising; a sensor beam extending between said arms and supported thereby for reflecting the transverse slope therebetween, a housing mounted on said beam, a pendulum, means swingably mounting said pendulum in said housing, a settable member located in said housing and positioned to represent a preselected slope quantity for said beam, means operatively connected to said pendulum for projecting the movement thereof to said settable member, signal means carried by said settable member for producing a signal responsive to movement of said pendulum upon deviation of said beam from said preselected slope, and settable programming means operatively connected with said settable member and said machine for resetting said settable member in uniform preselected increments responsive to given increments of travel of said machine to vary the slope setting of said settable member at a uniform rate of change in either direction over a course of travel, thereby effecting a uniform rate of change in the transverse slope between the draft arms.

22. In combination with a traveling machine having two independently movable members, a control system for controlling the positioning of said members with respect to each other and to a grade reference datum comprising; grade sensing and control means for maintaining one of said members at a constant elevation relative to said reference datum, a sensor beam extending between said members for reflecting the transverse slope therebetween, a housing mounted on said beam, a pendulum, means swingably mounting said pendulum in said housing, a settable member located in said housing and positioned to represent a preselected slope quantity for said beam, means operatively connected to said pendulum for projecting the movement thereof to said settable member, signal means carried by said settable member for producing a signal responsive to movement of said pendulum upon movement of said beam from said preselected slope, and settable programming means operatively connected with said settable member and said machine for resetting said settable member in uniform preselected given increments responsive to increments of travel of the machine to vary the slope setting of said settable member at a uniform rate of change in either direction over a course of travel, thereby effecting a uniform rate of change in the transverse slope between the movable members.

23. In a system for controlling the transverse slope between the draft arms of a traveling machine, a slope sensing and signal device comprising in combination; settable means for producing a directional slope control signal upon deviation from a preset slope quantity, means mounting said settable means so as to be responsive to deviations from said preset slope quantity in the transverse slope between said draft arms, and settable programming means operatively connected with said settable means and said machine for resetting said settable means in uniform preselected increments responsive to given increments of travel of said machine to vary the slope setting of said settable member at a uniform rate of change in either direction over a course of travel, thereby effecting a uniform rate of change in the transverse slope between said draft arms.

24. The combination according to claim 23 wherein; said draft arms are independently adjustable, grade sensing and a control means for maintaining one of said arms at a constant elevation relative to a grade reference datum, and control means for adjusting the other of said arms responsive to said slope control signal.

References Cited

UNITED STATES PATENTS

| | | | |
|---|---|---|---|
| 2,603,767 | 7/1952 | Ferrill | 318—489 X |
| 2,883,594 | 4/1959 | Alberts | 318—19 |
| 2,922,345 | 1/1960 | Mentes | 94—46 |
| 3,029,715 | 4/1962 | Bowen | 94—46 |
| 3,071,049 | 1/1963 | Pizzarotti | 94—46 |
| 3,181,441 | 5/1965 | Flom | 94—46 |
| 3,210,710 | 10/1965 | Amos | 94—46 X |
| 3,264,958 | 8/1966 | Babb | 94—46 |
| 3,264,959 | 8/1966 | Shea | 94—46 |

CHARLES E. O'CONNELL, *Primary Examiner.*

N. C. BYERS, *Assistant Examiner.*